(12) United States Patent
Taylor et al.

(10) Patent No.: US 9,189,125 B2
(45) Date of Patent: Nov. 17, 2015

(54) SYSTEMS AND METHODS FOR CONCURRENT ONLINE AND OFFLINE DOCUMENT PROCESSING

(71) Applicant: Quip, Inc., San Francisco, CA (US)

(72) Inventors: Bret Taylor, Lafayette, CA (US); Kevin Gibbs, San Francisco, CA (US); Jonathan Mcalister, San Francisco, CA (US); Casey Maloney Rosales Muller, San Francisco, CA (US); Patrick Linehan, San Francisco, CA (US); Matthew Cahill, San Francisco, CA (US); Mihai Paparita, Cupertino, CA (US)

(73) Assignee: Quip, Inc., San Francisco, CA (US)

( * ) Notice: Subject to any disclaimer, the term of this patent is extended or adjusted under 35 U.S.C. 154(b) by 0 days.

(21) Appl. No.: 14/213,960

(22) Filed: Mar. 14, 2014

(65) Prior Publication Data

US 2014/0282078 A1 Sep. 18, 2014

Related U.S. Application Data

(60) Provisional application No. 61/783,588, filed on Mar. 14, 2013.

(51) Int. Cl.
*G06F 17/00* (2006.01)
*G06F 3/0481* (2013.01)
*G06F 17/24* (2006.01)
*G06F 17/22* (2006.01)

(52) U.S. Cl.
CPC ........ *G06F 3/04812* (2013.01); *G06F 17/2288* (2013.01); *G06F 17/24* (2013.01)

(58) Field of Classification Search
CPC .................. G06F 17/2288; G06Q 10/103
USPC .................................... 715/229, 751
See application file for complete search history.

(56) References Cited

U.S. PATENT DOCUMENTS

| 2004/0085354 | A1* | 5/2004 | Massand | 345/751 |
|---|---|---|---|---|
| 2005/0033777 | A1* | 2/2005 | Moraes et al. | 707/202 |
| 2006/0026502 | A1* | 2/2006 | Dutta | 715/511 |
| 2009/0013262 | A1* | 1/2009 | Hamaguchi et al. | 715/751 |
| 2009/0199083 | A1* | 8/2009 | Sar et al. | 715/231 |
| 2009/0249224 | A1* | 10/2009 | Davis et al. | 715/753 |
| 2012/0030563 | A1* | 2/2012 | Lemonik et al. | 715/255 |

(Continued)

OTHER PUBLICATIONS

International Searching Authority, "Search Report" in application No. PCT/US14/28662, dated Oct. 15, 2014, 19 pages.
Claims in application No. PCT/US14/28662, dated Oct. 2014, 10 pages.

*Primary Examiner* — Scott Baderman
*Assistant Examiner* — Howard Cortes
(74) *Attorney, Agent, or Firm* — Hickman Palermo Becker Bingham LLP; Dominic Tsang

(57) ABSTRACT

In an embodiment, a method comprises associating a document with a document log; receiving, from a first client computer, a first section of the document; determining a first change in the document in the first section; generating a first message that includes the first change; storing the first message; sending, to each client computer of one or more client computers, the first message, which when received by the client computer, causes the client computer to update the document stored on the client computer with the first change and to present the first change to a user in a user interface associated with the document log.

20 Claims, 10 Drawing Sheets

(56) References Cited

U.S. PATENT DOCUMENTS

2012/0284344 A1* 11/2012 Costenaro et al. ............ 709/206
2013/0268849 A1* 10/2013 Du ................................ 715/255
2014/0149857 A1* 5/2014 Vagell et al. .................. 715/255
2014/0195899 A1* 7/2014 Bastide et al. ................ 715/256

* cited by examiner

SYSTEMS AND METHODS FOR CONCURRENT ONLINE AND OFFLINE DOCUMENT PROCESSING

CROSS-REFERENCE TO RELATED APPLICATIONS; BENEFIT CLAIM

This application claims the benefit under 35 U.S.C. §119 (e) of provisional application 61/783,588, filed Mar. 14, 2013, the entire contents of which are hereby incorporated by reference for all purposes as if fully set forth herein.

FIELD OF THE DISCLOSURE

The present disclosure relates to techniques for editing and maintaining a document, and relates more specifically to a system for one or more users concurrently editing a document over time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Editing and sharing documents with a group of people can be very difficult. For example, a person in a group may author a document and send the document to group members to review and edit. Each group member may make edits and send an edited version back to the original author to review. Unfortunately, edits from various group members may be difficult and time consuming to merge. Furthermore, some edits for different group member may conflict with each other. For example, one group member may remove part of a sentence, another group member may re-word the sentence, and yet another group member may move the original sentence to another part of the document. The original author may be overwhelmed trying to merge the edits of the various members.

As an alternative, a group member may create an "online" document hosted by a web server. The group member may invite other group members to view and edit the online document. For example, a group member, through a web browser displaying the document, may select a cursor location and a character to insert at the cursor location. In response, the web browser may send the cursor location and the character to a web server hosting the online document. The web server may update the online document stored on the web server and echo the cursor location and character to other web browsers displaying the online document. Each browser that receives the cursor location and character may update the document displayed accordingly Web servers hosting an online document may require that group members edit the document while online. Otherwise, group members may create conflicting versions of the same online document while editing the document offline.

Viewing online documents can be difficult on different devices. For example, online documents may be page-based. In a page-based document, the content in the document may be rendered as if printed on a standard cut sheet of paper. However, some devices, such as mobile phones, may have small view ports that make viewing a page-based document difficult. Some mobile devices allow users to zoom in and out of a document as needed. But zooming in an out of documents can be a frustrating user experience.

SUMMARY

The appended claims may serve as a summary of the invention.

Figure 1:
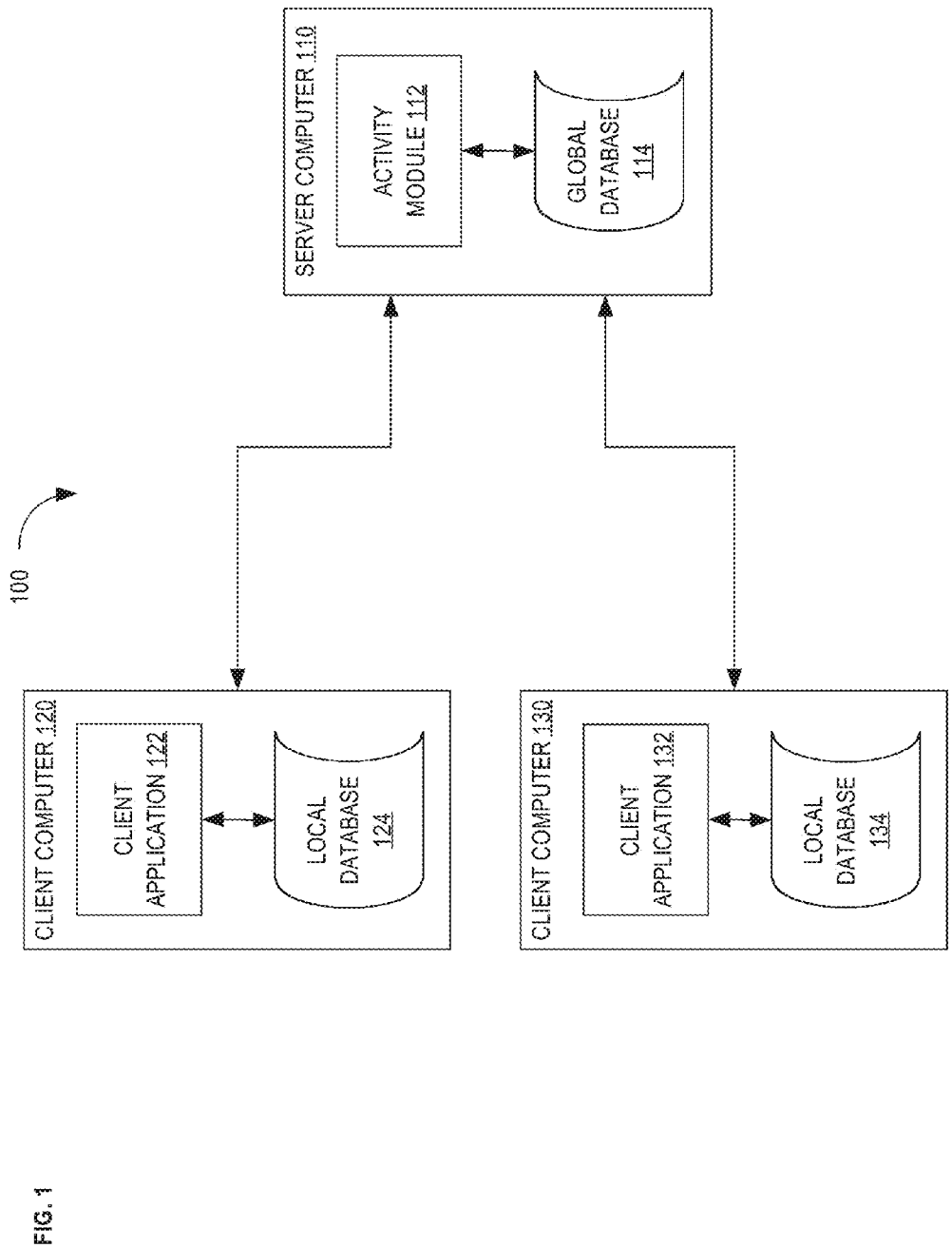
FIG. 1 illustrates a multi-client system, which one or more users may use to edit a document concurrently and/or offline, in an example embodiment.

While each of the drawing figures illustrates a particular embodiment for purposes of illustrating a clear example, other embodiments may omit, add to, reorder, and/or modify any of the elements shown in the figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Documents
      2.1 Sections
      2.2 Document Logs and Messages
      2.3 Associations
   3.0 Network Topology
      3.1 Server Computer
         3.1.1 Activity Module
      3.2 Client Computer
         3.2.1 Client Application 4.0 Process Overview
 4.1 Updating a Document Log and an Associated Document on a Client Computer based on User Input and/or Messages Received from a Server Computer
  4.1.1 Showing Section Changes
  4.1.2 Grouping Edits
   4.1.2.1 Grouping Edits into the Same Graphical Tile
   4.1.2.2 Grouping Graphical Tiles
  4.1.3 Adding Comments to the Document Log
  4.1.4 Jumping to Sections in a Document using the Document Log
 4.2 Editing a Document and Updating the Changes to the Global Database
  4.2.1 Editing a Document on a Client Computer
   4.2.1.1 Creating a New Section in a Document
   4.2.1.2 Removing a Section in a Document
   4.2.1.3 Moving a Section Within a Document
   4.2.1.4 Updating a Section in a Document
  4.2.2 Uploading Changes to a Server Computer
  4.2.3 Maintaining a Global Database on a Server Computer
   4.2.3.1 Determining a Change in a Section
    4.2.3.1.1 Generating a New Version of a Section using a Three-Way Merge
    4.2.3.1.2 Locking a Section
    4.2.3.1.3 Updating the Sequence Value of a Parent Section
   4.2.3.2 Sending a New Message to one or more Client Applications
 4.3 Displaying Documents on Different Devices with Specialized Client Applications
  4.3.1 Images (get inserted at a certain point and are "full bleed" on a mobile device, but at a particular location and size in a desktop computer)
5.0 Implementation Mechanisms—Hardware Overview
6.0 Other Aspects of Disclosure
1.0 General Overview In an embodiment, a method comprises associating a document with a document log; receiving, from a first client computer, a first section of the document; determining a first change in the document in the first section; generating a first message that includes the first change; storing the first message; sending, to each client computer of one or more client computers, the first message, which when received by the client computer, causes the client computer to update the document stored on the client computer with the first change and to present the first change to a user in a user interface associated with the document log.

The method comprising storing data indicating the first change was made at a first time by a first user; sending, to each client computer of the one or more client computers, data indicating the first user made the first change at the first time; receiving, from the first client computer, a second section of the document; determining a second change in the document in the second section; determining that the second change was made by the first user at a second time; determining that the second change is part of a first session based, at least in part, on determining that the first user made the first change and the second change within a particular interval of time based, at least in part, on the first time and the second time; generating a second message that includes the second change and data indicating the first user made the second change at the second time and is part of the first session; storing the second message; sending, to each client computer of the one or more client computers, the second message, which when received by the client computer, causes the client computer to update the document stored on the client computer with the second change and to present either the first change or the second change to a user in the user interface associated with the document log.

In an embodiment, a method comprises associating a document log with a document, which comprises a plurality of sections, wherein each section comprises a set of data and a set of metadata describing how the set of data should be displayed to a user; receiving, from a server computer, a plurality of update messages associated with the document log, wherein each update message is associated with a particular section in the document, indicates a change, indicates a time; for each update message in the plurality of update messages: updating the particular section in the document; generating a graphical tile, wherein the graphical tile is associated with the update message and includes at least a portion of the set of data associated with the section and the change emphasized in stylized text; causing to display, on a display coupled to a client computer, the graphical tile associated with the update message in a graphical tile list in a graphical user interface in an order based, at least in part, on the time in the update message.

In an embodiment, a system comprises a first client computer comprising: a first display; a first storage; a first document engine, wherein the first document engine is configured to: store, in the first storage, a document comprised of a plurality of sections, wherein each section comprises a set of data and a set of metadata that describes how the set of data should be presented to a user; cause to display, on the first display, one or more sections of the plurality of sections based on the set of metadata in the one or more sections and a first set of rules; a second client computer comprising: a second display; a second storage; a second document engine, wherein the second document engine is configured to: store, in the second storage, the document; cause to display, on the second display, the one or more sections of the plurality of sections based on the set of metadata in the one or more sections and a second set of rules.

2.0 Documents

A document may be a section-based document, which is comprised of one or more sections. A section-based document need not be a traditional word processing document. For example, a document may be a spreadsheet, wherein each cell is a separate section. A document may be a checklist, wherein each check box and/or description is a section. A document may be a collage, wherein each object in the collage is a section. A document may be a task list, wherein each task is a section. A document may be a collection of canvases, wherein each canvas is a section. A document may comprise one or more different types of sections. For example, a document may include a section with a paragraph, followed by a section with an image, followed by a section with one or more tasks, followed by a spreadsheet.

2.1 Sections

A section may comprise content to be presented to a user and metadata that identifies the section and describes how the content may be presented to a user by one or more client computers. For example, a section may comprise a paragraph of text and metadata describing the font of the text in the section. The content in a section may include content comprising one or more characters, one or more checkboxes, one or more fields, one or more pills, one or more dropdowns, one or more notes, one or more tables, one or more cells, one or more polls, one or more maps, one or more images, one or more drawings, and/or any other content to present to a user.

Segmenting a document into sections may reduce the number of errors, conflicts, and/or locks required when users edit the same document concurrently and/or offline. For example, if a first user is editing a document, and a second user begins editing the same document, then the server storing the document may an raise error, insert additional text or markers indicating differences between the document edited by the first user and the second user, and/or lock the second user out until the first user finishes editing the document. In contrast, if a first user edits a first section in a document and a second user edits a second, different section in a document, then both sections may be updated concurrently without any errors, locks, and/or conflicts on the document as a whole.

A section may comprise one or more other sections. For example, a parent section may comprise a first child section that defines a checkbox, and a second section that comprises text describing the purpose of the checkbox. In an embodiment, a document may be a section that does not have a parent section, but has one or more child sections.

Metadata in a section may identify the section. For example, metadata in a section may include a global identifier that identifies the section. Thus, if two sections have the same global identifier, then the two sections may be determined to be different versions of the same section.

Metadata in a section may identify a version of the section. For example, metadata for a section may include a sequence value that monotonically increases if the content and/or the metadata in the section are modified. Thus, if two sections are determined to be the same section, but the metadata in first section has a higher sequence value than the metadata in the second section, then the first section may be determined to be a more recent version than the second section.

Metadata in a section may include an address that that may be used to determine the order in which sections are presented in a document and/or parent section. For example, if a parent section includes two child sections, and the first child section has an address that is less than the second child section, then the first child section may be presented before the second child section.

Metadata in a section may include other information. For example, metadata in a particular section may describe the indentation level, color, margin size, and/or state of the content in the section.

2.2 Document Logs and Messages

A document log may comprise one or more messages related to a document, and may be associated with a document and/or one or more users. A message may comprise a document, a section, a comment made by a user, a status update associated with a document, a status update associated with a section, a change in a document, a change in a section, a request to associate a document log with a document, an invitation to a user to be associated with a document log and/or a document, an acceptance from a user to be associated with a document log and/or a document, and/or any other data related to a document log, a document, and/or a section. A message may have an attachment, such as an image or other document. A message may include one or more identifiers that associate the message with a document log, document, and/or section. A message may include one or more identifiers that associate the message with a document log, document, and/or section. In an embodiment, a document log may be associated with a single document. In an embodiment, a document log may be associated with one or more documents.

A document log may be associated with one or more users. When a new message is associated with a document log, then each user associated with the document log may receive the new message on one or more devices.

2.3 Associations

A user or section may be associated with a document. Likewise a user or section may be associated with a document log. If an object, such as a user, section, or message, is associated with a document log and the document log is associated with a document, then the object is associated with the document and vice versa. For example, if a document log is associated with a document, and one or more messages are associated with the document log, then the one or more messages may be directly or impliedly associated with the document. If an object, such as a user, section, or message, is associated with a document and the document is associated with a document log, then the object is associated with the document log and vice versa. For example, if a document log is associated with a document, and one or more users are associated with the document, then the one or more messages may be directly or impliedly associated with the document log.

3.0 Network Topology

FIG. 1 illustrates a multi-client system, which one or more users may use to edit a document concurrently and/or offline, in an example embodiment. In FIG. 1, system 100 comprises server computer 110, client computer 120, and client computer 130, which are communicatively coupled across one or more computer networks, such as the Internet. A computer may be one or more physical computers, virtual computers, and/or computing devices. As an example, a computer may be one or more server computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers.

3.1 Server Computer

Server computer 110 may comprise activity module 112 and global database 114. A database may be an organized collection of data defined by one or more schemas. An example of a database includes a flat file database, a file system, and/or a relational database. While activity module 112 and global database 114 are illustrated as if on the same computer, activity module 112 and global database 114 may be on one or more separate computers communicatively coupled through one or more networks.

3.1.1 Activity Module

Activity module 112 may send messages to, and receive messages from, client computers and maintain one or more document logs, documents, and/or sections in global database 114. For example, activity module 112 may receive a message from a client computer to create a document log. In response, activity module 112 may create a data structure, such as a record, that represents a document log in global database 114.

Activity module 112 may receive a message to create a document and associate the document with the document log in the previous example. In response, activity module 112 may create a data structure that represents a document in global database 114.

Activity module 112 may receive a message to add a new section to the document. In response, activity module 112 may create a data structure the represents the new section in global database 114, and associate the new section with the document.

Activity module 112 may receive a message to add a comment to the document log associated with the document. In response, activity module 112 may create a data structure in global database 114 the represents the comment, and associate the comment with the document log. Activity module 112 may be used to perform many other features discussed in detail herein.

For convenience of expression, if an activity module adds, updates, and/or removes a document log, message, document, and/or section, then the activity module may add, update, and/or remove one or more data structures stored in a corresponding global database to indicate the same. For example, if activity module 112 adds a section to a document, then activity module may create a data structure in global database 114, and associate the data structure with a data structure that corresponds to the document.

For convenience of expression, if an activity module echoes a message, the activity module may send a message previously received from a client application to one or more client applications. The client application that the message was sent from may be included in the one or more client applications that the activity module sends the received message to.

The activity module may selectively echo messages to one or more client applications. For example, if activity module 112 receives a message from client application 122, and the message is associated with a particular document log and/or document, then the activity module 112 may echo the message to one or more client applications being used by users that are associated with the particular document log and/or document.

An activity module may modify received messages and echo the modified messages. For example, if activity module 112 receives a message that includes text from a section, then activity module 112 may compare the text in the section with the text in a previous version of the section, and determine the text that changed. Activity module 112 may update the message to include data indicating the text that changed. Activity module 112 may echo the updated message to one or more client applications.

An activity module may save a message and send it later. For example, if activity module 112 receives a message associated with a particular document log from client application 122, then activity module 112 may save the message. Activity module 112 may echo the saved message to client application 132 at a later time, such as when client application 132 is connected to a network coupled to activity module 112.

3.2 Client Computer

Client computer 120 comprises client application 122 and local database 124. Client computer 130 comprises client application 132 and local database 134. While client application 122 and local database 124 are illustrated as if on the same computer, client application 122 and local database 124 may be on one or more separate computers communicatively coupled through one or more networks. Likewise, while client application 132 and local database 134 are illustrated as if on the same computer, client application 132 and local database 134 may be on one or more separate computers communicatively coupled through one or more networks.

Client computer 120 and client computer 130 may be different types of computers. For example, client computer 120 may be a desktop computer and client computer 130 may be a mobile phone.

3.2.1 Client Application

Client application 122 and client application 132 may send messages to, and receive messages from, activity module 112 and maintain one or more document logs, documents, and/or sections in local database 124 and local database 134, respectively. Client application 122 and client application 132 may receive input from one or more users through client computer 120 and client computer 130, respectively. Client application 122 and client application 132 may generate messages, modify one or more sections, store the messages and/or modified sections in local database 124 and local database 134, respectively, and/or upload messages to activity module 112.

Client application 122 and client application 132 may be different client applications. For example, client application 122 may be a desktop application customized for, and executed on, a desktop computer. Client application 132 may be a mobile application that is customized for, and executed on, a mobile phone. Furthermore, client application 122 may cause a document to be displayed on a display differently than client application 132, as discussed in detail herein.

For convenience of expression, if a client application adds, updates, and/or removes a document log, message, document, and/or section, then the client application may add, update, and/or remove one or more data structures stored in a corresponding local database to indicate the same. For example, if client application 122 adds a section to a document, then client application 122 may create a data structure that corresponds to the section in local database 124, and associate the data structure that corresponds to the section with a data structure that corresponds to the document. Furthermore, if a client application adds, updates, and/or removes a document log, message, document, and/or section, then the client application may cause the client computer executing the client application to update a user interface accordingly. For example, if client application 122 adds a character to a section, and the section is being displayed on a display, then client application 122 may cause client computer 120 to display the new character in the section on the display.

4.0 Process Overview

Among other things exemplary processes are described herein for creating a document log, creating a document, associating the document with the document log, updating the document log, updating the document, displaying the document log, and/or displaying the document on one or more displays coupled to one or more computers. In the following example, processes are performed on one or more client computers and/or a server computer. However, in other embodiments, the processes performed by one or more client computers may be performed by one or more server computers. Likewise, the processes performed by one or more server computers may be performed by one or more client computers.

Figure 2:
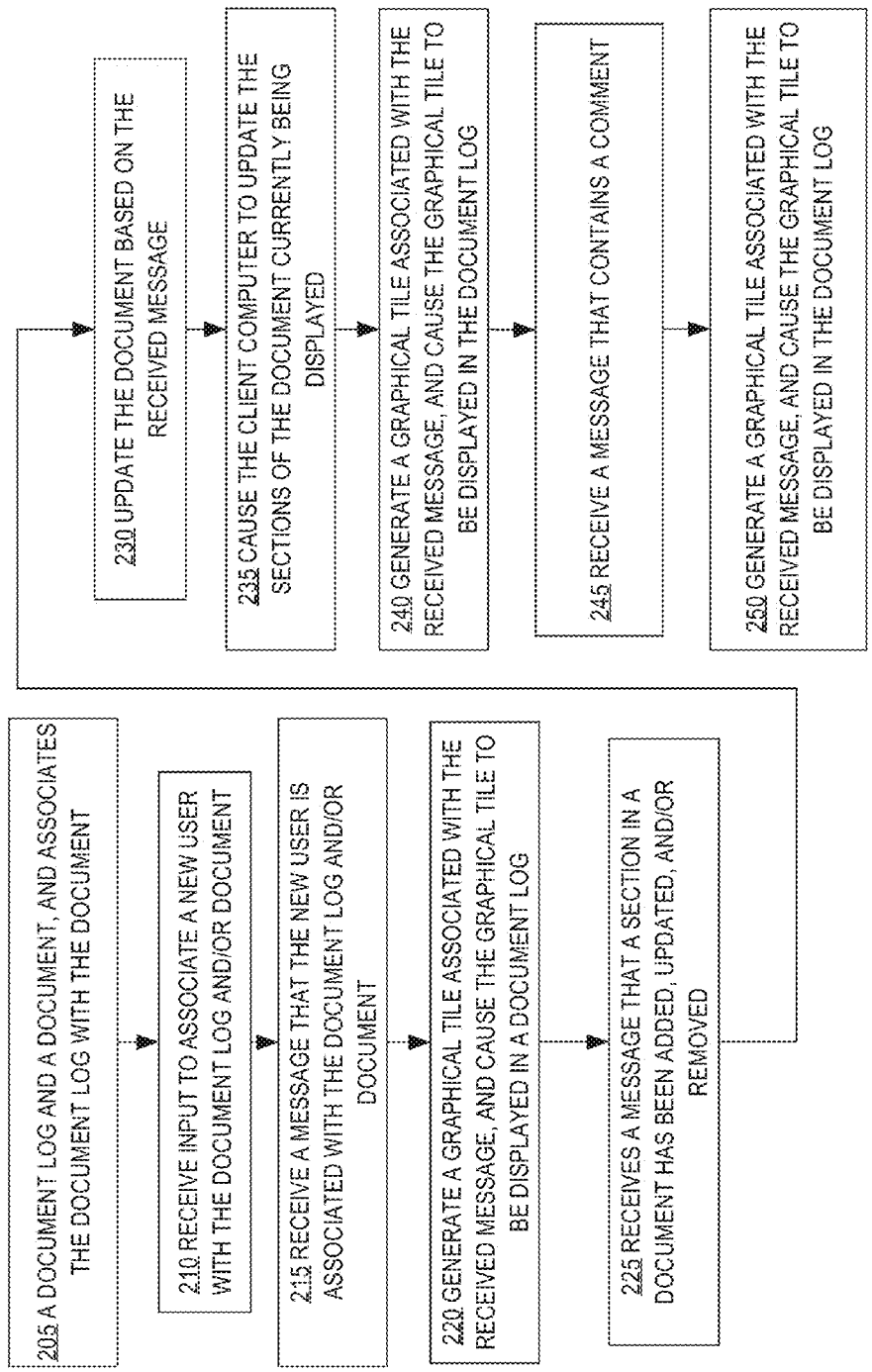
FIG. 2 illustrates a process for creating a document log, associating the document log with a document, associating users with the document log and/or document, and updating the document log, and updating the document, in an example embodiment

4.1 Updating a Document Log and an Associated Document on a Client Computer Based on a Message Received from a Server Computer FIG. 2 illustrates a process for creating a document log, associating the document log with a document, associating users with the document log and/or document, and updating the document log, and updating the document, in an example embodiment. In block 205, a client application creates a document log and a document, and associates the document log with the document. For example, in response to receiving input from a user through client computer 120, and/or one or more messages from activity module 112, client application 122 may create a document log 610 and a document 650 illustrated in FIGS. 6A and 6B. Client application 122 may associate the document log and the document with each other. Client application 122 may associate the user the document log and/or document. For example, client application 122 may associate a user identifier that identifies the user with the document log and/or document.

Figure 6A:
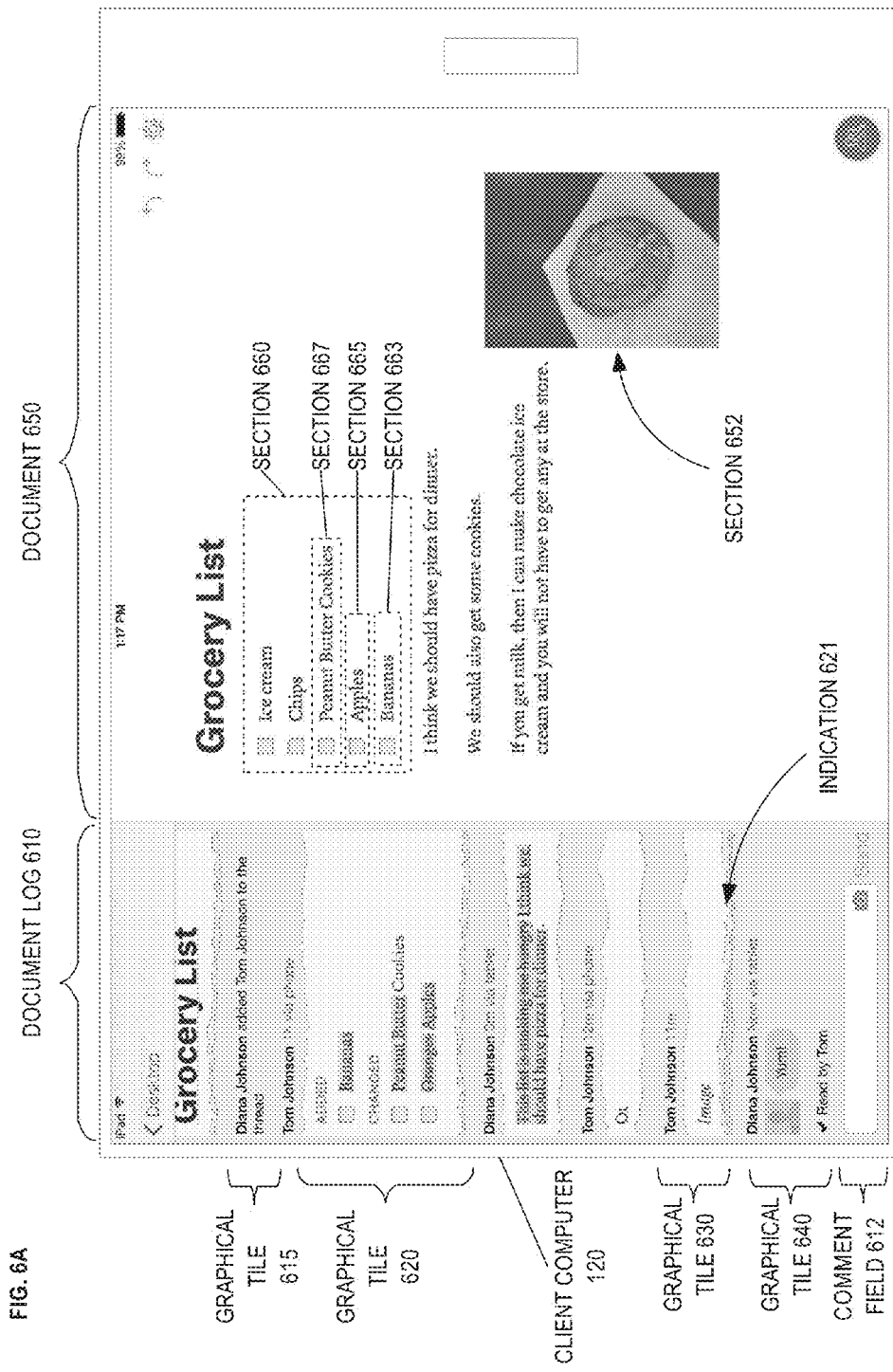
FIG. 6A, FIG. 6B, FIG. 6C, FIG. 6D each illustrate a graphical user interface that comprises a section-based document, and which may be caused to be displayed on a display by a specialized rendering engine, in an example embodiment.

FIG. 6A, FIG. 6B, FIG. 6C, FIG. 6D each illustrate a graphical user interface that comprises a section-based document, and which may be displayed on a display, in an example embodiment. The graphical user interfaces in FIG. 6A and FIG. 6B also illustrate a document log associated with the document. In FIG. 6A, graphical user interface 602 is presented on client computer 120. Graphical user interface 602 comprises a graphical representation of document log 610 and document 650.

Returning to block 405, client application 122 may send a message to activity module 112 to create document log 610 and document 650. In response activity module 112 may create document log 610 and document 650 in global database 114.

In block 210, the client application receives input to associate a new user with the document log and/or document. For example, client application 122 may receive input from a first user, "Diana Johnson", indicating that a second user, "Tom Johnson", should be associated with the document log and/or document. The second user may be identified by a name, email address, username, phone number, alpha-numeric string, and/or any other user identifier. In response, client application 122 may send a message to activity module 112 requesting that Tom be associated with document log 610 and/or document 650.

For purposes of illustrating a clear example, assume that the second user, Tom, is logged in and using client application 132. Activity module 112 may send a message to the user, through client application 132, inviting the second user, Tom, to join the document log and/or document. Client application 132 may present the invitation to Tom. Client application 132 may receive the user's response through client computer 130 indicating that Tom has accepted the invitation. In response, client application 132 may send a message to activity module 112 indicating that Tom has accepted the invitation. Activity module 112 may update global database 114, such that Tom is associated with document log 610 and/or document 650.

Activity module may echo the acceptance to client application 122. Additionally, activity module 112 may send client application 132 one or more messages comprising data in global database 114 associated with document log 610 and/or document 650.

In block 215, the client application receives a message that the new user is associated with the document log and/or document. For example, client application 122 may receive a message from activity module 112 that a new user, "Tom Johnson", has been added to, or associated with, the document log and/or document. In response, client application 122 may associate Tom with document log 610 and/or document 650 in local database 124. Also for example, client application 132 may receive the one or more messages comprising data in global database 114 associated with document log 610 and/or document 650. In response, client application 132 may store the messages, and/or data in the messages, in local database 134, such that local database 134 includes a copy of the data related to document log 610 and/or document 650. Thus, client application 132 may display document log 610 and/or document 650 to Tom Johnson through client computer 130.

In block 220, the client application generates a graphical tile associated with the received message, and causes the graphical tile to be displayed in a document log. For example client application 122 may cause graphical tile 615 to be displayed in document log 610, which indicates that the user, Tom Johnson, has been added to document log 610 and/or document 650.

In block 225, the client application receives a message that a section in a document has been added, updated, and/or removed. For example, client application 122 may receive a message from activity module 112 that Tom Johnson added section 663 to section 660. The message may indicate that the section 663 comprises a checkbox with the text, "Bananas". Furthermore, the message may indicate that Tom Johnson changed section 665 to be a checkbox with the text, "Apples", and not "Oranges". Furthermore, the message may indicate that Tom Johnson changed section 667 to be a checkbox with the text, "Peanut Butter Cookies", instead of just "Cookies".

In block 230, the client application updates the document based on the received message. For example, client application 122 may update section 660 by adding section 663, and updating section 665 and section 667 as indicated in the message.

In block 235, the client application causes the client computer to update the sections of the document currently being displayed. For example, client application 122 may cause client computer 120 to update a display such that section 663 is added, section 665 is updated, and section 667 is updated.

In block 240, the client application generates a graphical tile associated with the received message, and causes the graphical tile to be displayed in the document log. For example, client application 122 may cause graphical tile 620 to be display in document log 610, which indicates that the user, Tom Johnson, added the content in section 663, and modified the content in section 665 and section 667. The graphical tile may include other information included in, and/or derived from, the message. For example, graphical tile 620 may indicate that changes were made an hour ago with a mobile device, such as a phone.

4.1.1 Showing Section Changes

A graphical tile in the document log may highlight or otherwise stylize the change(s) in a graphical tile. For example, Graphical tile 620 may highlight and/or underline content added by the user, such as "Apples". Also for example, graphical tile 620 may highlight and/or strikethrough content removed by the user, such as "Oranges".

A summary of added, updated, or deleted content may be shown in a graphical tile. For example, graphical tile 632 in document log 610 indicates that an image was added, by including the italicized word "Image" and underlining it. A graphical tile may show a portion of the added, updated, or deleted content. For example, a graphical tile may include a portion of an added image. Also for example, a graphical tile may include the first one or more sentences of an added paragraph.

Showing changes in a graphical tile in a document log lets a user see what changed and when. Showing the changes in graphical tiles also allows the rendered document to show a clean, up to date version.

4.1.2 Grouping Edits by Session

A session comprises one or more edits to a document over some amount of time. Users may edit multiple sections during a session. Graphical tiles that show changes or edits made in the same session may be grouped together in a single graphical tile and/or a group of graphical tiles.

A client application may determine whether two or more edits were made in the same session based on one or more factors, such as the amount of time between edits, where the edited sections are in the document, whether a user used the same computer to make both edits, whether another user began editing the document, the location of the user(s), and/or any other factors. For example, if a client application receives a new message indicating that a new section was edited, the new edited section is adjacent to a previously edited section in a document, the new edited section and the previously edited section were edited by the same user on the same device, and/or within a particular amount of time, then client application 122 may determine that the edits were part of the same session.

An activity module may determine whether two or more edits are part of the same session. For example, if activity module 112 receives a first message from a client application indicating that a first section was edited, activity module 112 receives a second message from the client application indicating that a second section was edited, the first edited section and the second edited section were edited by the same user on the same device, and/or within a particular amount of time, then activity module 112 may determine that the edits in the edited sections were part of the same session. If activity module 112 determines that an edit and/or change in a message is part of a new session, then activity module 112 may generate a new session identifier in global database 114, add the new session identifier to the message, and send the message to one or more client applications. If activity module 112 determines that an edit in a message is part of a previous session, then activity module 112 may add the session identifier of the previous session to the message and send the message to one or more client applications.

4.1.2.1 Grouping Edits into the Same Graphical Tile

Edits that are part of the same session may be included in the same graphical tile. To illustrate a clear example of including edits into the same graphical tile, assume client application 122 received three separate messages, each message indicating an edit to one of the sections 663, 665, or 667. To keep document log 610 clean and to not disrupt a reader, if client application 122 determines the edits in the three messages are part of the same session and are in adjacent sections in the document, then client application 122 may include the edits in the same graphical tile, as illustrated in graphical tile 620. The factors in this example, and/or one or more other factors may be used to determine whether edits should be grouped into the same graphical tile.

4.1.2.2 Grouping Graphical Tiles

Edits that are part of the same session may be included in separate, but grouped graphical tiles. For purposes of illustrating a clear example, assume that client application 122 receives three messages from activity module 112 and each message includes data describing one or more edits to one or more sections. If client application 122 and/or activity module 112 determines that the edits described in each message are part of the same session, then client application 122 may generate two graphical tiles and present the graphical tiles as a group. For example, graphical tile 630 includes indication 621, which indicates that other graphical tiles are grouped with the graphical tile displayed.

Figure 6B:
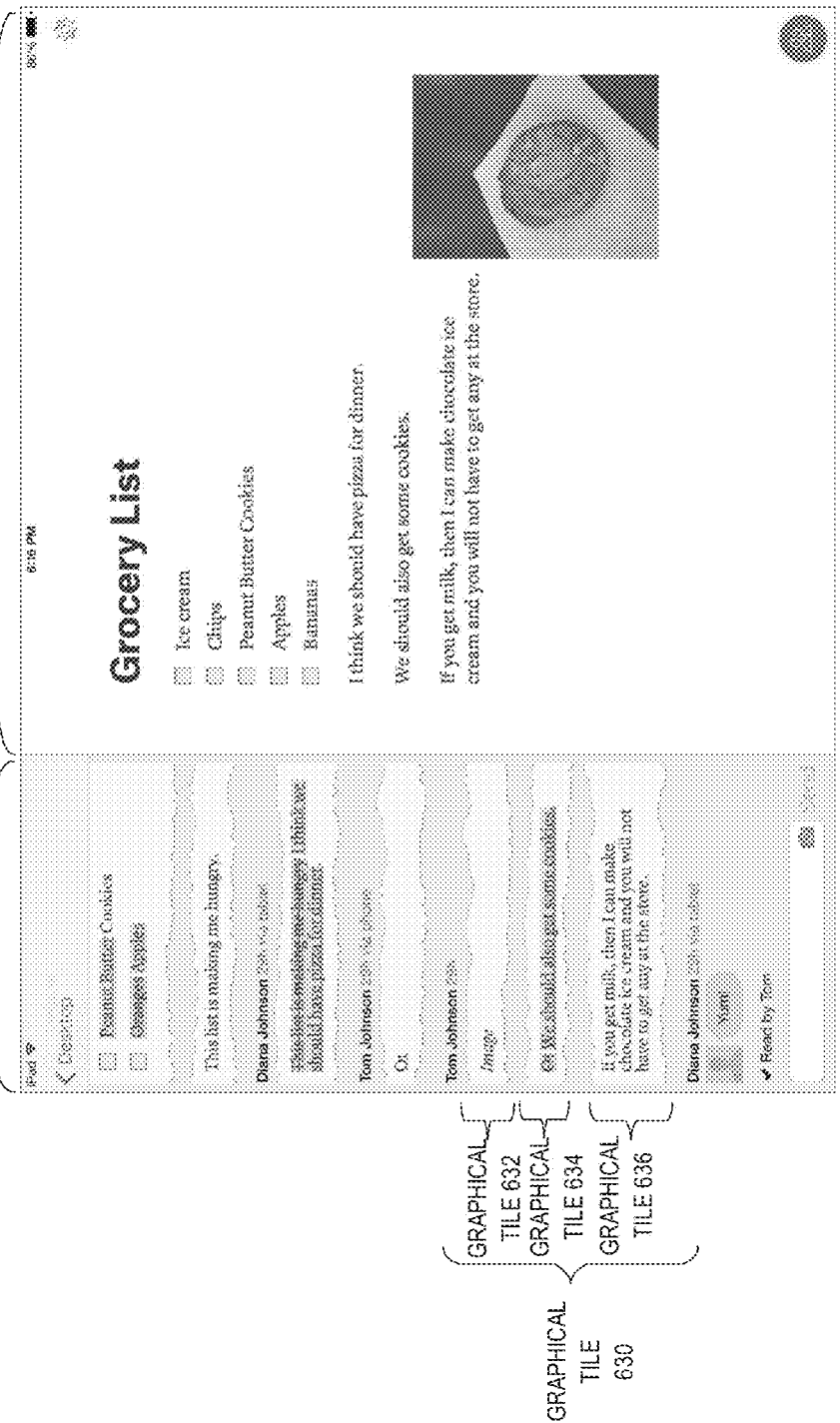
Figure 6D:
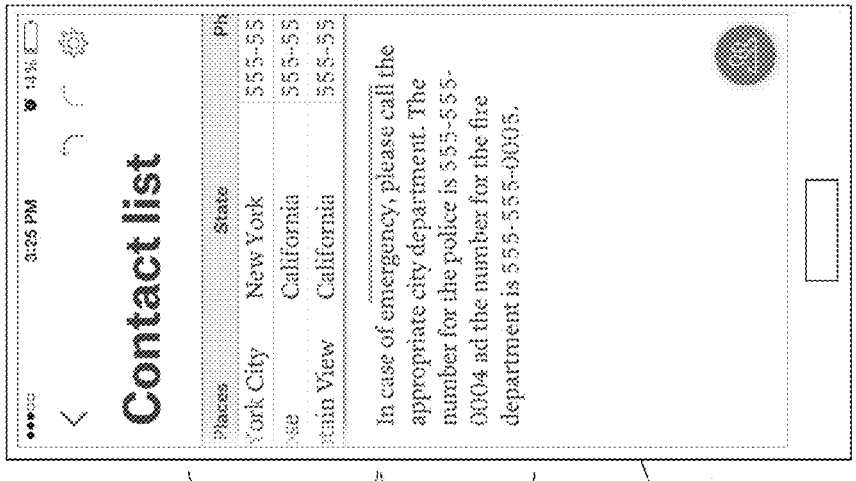

A client application may cause grouped graphical tiles to be displayed separately. For example, on a touch screen device, a user may touch, or touch and hold, a portion of the screen displaying graphical tile 630. In response, client computer 120 may generate and send the input data to client application 122. In response, to receiving the user input indicating that the a user selected graphical tile 630, client application 122 may cause graphical tile 630 to expand and show graphical tile 632, graphical tile 634, and graphical tile 636, as illustrated in FIG. 6B.

A client application may select a graphical tile in a group of graphical tiles to be a representative graphical tile. For example, client application 122 may select graphical tile 632 in FIG. 6B to be the representative graphical tile shown in graphical tile 630, as illustrated in FIG. 6A.

The client application may select the representative graphical tile based on one or more factors. For example, client application 122 may select the graphical tile associated with the latest edit to be the representative graphical tile. Additionally or alternatively, client application 122 may select the graphical tile associated with the earliest edit to be the representative graphical tile. Additionally or alternatively, client application 122 may select the graphical tile associated with the most extensive edit to be the representative graphical tile. Additionally or alternatively, an activity module may select the representative graphical tile using one or more of the factors discussed above and include a parameter in a message indicating which edit(s) in a particular message should be used to generate the representative graphical tile.

4.1.3 Adding Comments to the Document Log

Returning to FIG. 2, in block 245, the client application receives a message that contains a comment. For example, a user, using client application 122, on client computer 120, may input text and/or other content into comment field 612. In response, client application 122 may send a message to activity module 112 with the comment and with data indicating that the comment is associated with document log 610. Activity module 112 may echo the message to each client application that is being used by a user associated with document log 610, including client application 122.

In block 250, the client application generates a graphical tile associated with the received message, and causes the graphical tile to be displayed in the document log. For example, client application 122 may cause graphical tile 640 to be displayed in document log 610, which indicates that the user, Diana Johnson, added the comment, "Yum!" to document log 610. The graphical tile may include other information included in, and/or derived from, the message. For example, the time the comment was made and the type of client computer used by the comment's author to make the comment. If the comment includes a file, image, and/or other data, then graphical tile may include an icon and/or link to the file, image, and/or other data. Associating and displaying comments and/or other message in the document log allow users to join and leave the document log and/or document, but the dialog and changes regarding the document, or sections in the document, remain coupled with the document.

The graphical tile may include other information received from subsequent messages. For example, if client application 132 causes the comment to be displayed on a display coupled with client computer 130, which the user, Tom Johnson, is using, then client application 132 may send a message to activity module 112 indicating that Tom Johnson read the message. In response, activity module 112 may echo the message to each client application that is being used by a user associated with document log 610. Accordingly, client application 122 may receive the message and cause graphical tile 640 to be updated to include the text, "read by Tom".

4.1.4 Jumping to Sections in a Document Using the Document Log

In response to receiving input indicating that a user selected a graphical tile that is associated with a section in a document, the client application may cause the section to be presented to the user. For example, if client application 122 receives input from client computer 120 that a user selected graphical tile 620, which may be associated with sections 663, 665, and 667, then client application 122 may cause a portion of document 650 which includes sections 663, 665, and 667 to be presented to the user. Additionally or alternatively, in response to the input, client application 122 may cause a portion of document 650, which includes the parent of each selected section to be presented to the user, such as section 660.

4.2 Editing a Document and Updating the Changes to the Global Database

A client application may receive input from a user through a client computer to edit one or more sections in a document. In response, the client application may create, remove, and/or update sections in the document and store the changes in a local database. Concurrently and/or subsequently, the client application may send messages to an activity module executed on a server computer. The message may include the new, removed, and/or updated section(s) in the document. The activity module may update a global database and echo the message to other client applications being used by users associated with the document.

4.2.1 Editing a Document on a Client Computer

Figure 3:
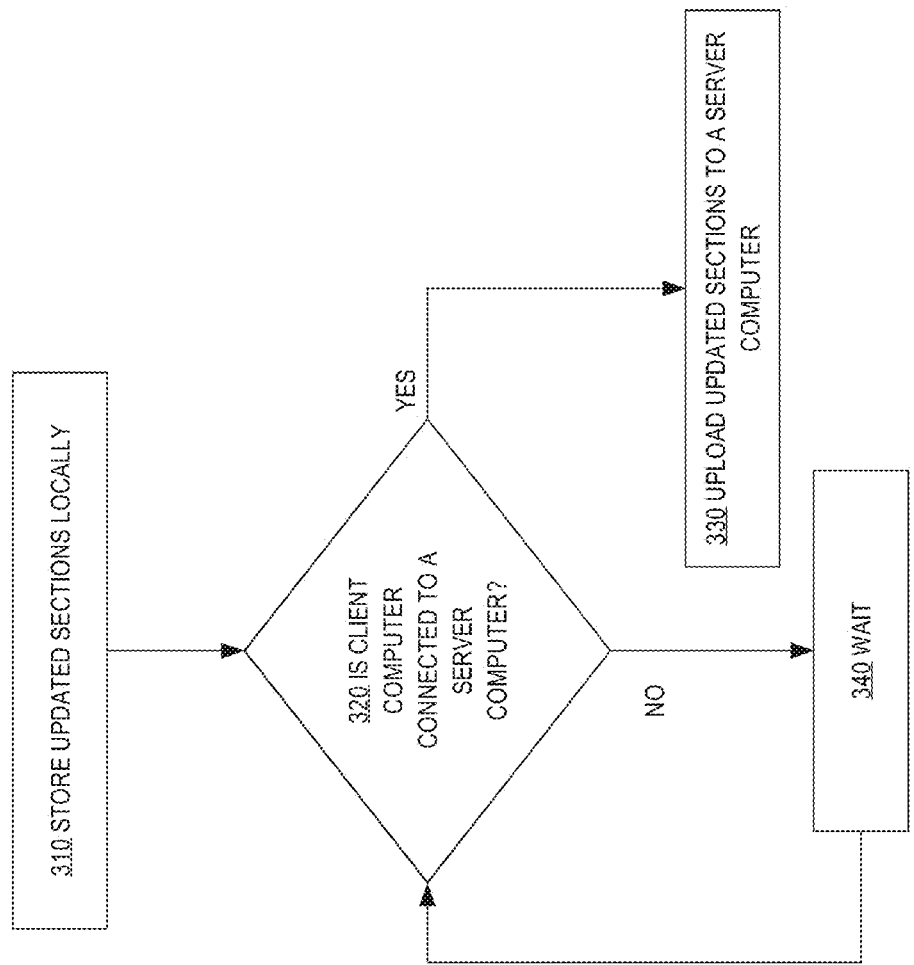
FIG. 3 illustrates a process for updating a document on a client computer, in an example embodiment.

FIG. 3 illustrates a process for updating a document on a client computer, in an example embodiment. In block 310, a client application receives input through a client computer from a user to update one or more sections in a document and stores the update in a local database. For example, client application 122 may receive data indicating that a user wants to create, update, and/or remove one or more sections in a document. In response, client application 122 may create, update, and/or remove one or more sections in local database 124.

The following sections give specific examples of creating, update, and/or removing sections in a document, according to an embodiment. Other embodiments may use other mechanisms to create, update, and/or remove sections in a document.

4.2.1.1 Creating a New Section in a Document

A client application may create a new section at a particular location in a document in response to user input. For example, client application 122 may receive input to create a new document. In response, client application 122 may create a new document, and create a first, blank section in the document.

In another example, client application 122 may receive input comprising a carriage return at a cursor location in document 650. In response, client application 122 may create a new section and assign an address to the new section that is greater than the address of a first section, which corresponds to the cursor location when the carriage return was entered. If the document includes a second section that has an address that is greater than the address associated with the first section, then client application 122 may assign the new section an address that is less than the address of the second section. Client application 122 may update addresses in one or more existing sections to maintain the same section order as before, with the exception of the new section being between the first section and the second section. The content that appears after the cursor location in the first section may be moved to the new section.

As another example, client application 122 may receive input indicating a user has selected an image. In response client application 122 may create a new section at the location of the cursor and include the image in the new section.

4.2.1.2 Removing a Section in a Document

A client application may remove a section in a document in response to user input. For example, client application 122 may receive input indicating a user has selected the content in a section and that the user has pressed a delete key. In response, the client application may delete the section, and the section's content, from the document.

4.2.1.3 Moving a Section within a Document

A client application may move a section within a document in response to user input. For example, client application 122 may receive input indicating that a user has selected a section, and/or content in a section. Client application 122 may receive additional input indicating that the user wants to move the selected section, and/or content in the selected section, between a first section and a second section in the document. In response, client application 122 may reassign the address assigned to the selected section, such that the address of the selected section is greater than the address of the first section and less than address of the second section.

4.2.1.4 Updating a Section in a Document

A client application may update a section in a document in response to user input. For example, client application 122 may receive input indicating that a user has selected a character on a keyboard. In response, client application 122 may insert the character in a section based on the location of a cursor. Also for example, client application 122 may receive input indicating that a user has selected a checkbox in section 665. In response, client application 122 may toggle the checkbox in section 665. While these examples of updating a section comprise updating the content in a section, an update may include one or more changes to the content and/or metadata in a section.

Updating the content and/or metadata in a section need not change and/or move other content and/or metadata. For example, if client application 122 receives input indicating that the user wants to change section 662 in document 650 to a paragraph rather than a checkbox, then client application 122 may update the metadata to indicate that section 662 is a paragraph. However, client application 122 need not change the indentation level. Thus, if client application 122 receives input indicating the user wants to change section 662 back to a checkbox, then client application 122 may update the metadata to indicate that section 662 is a checkbox and section 662 may retain have the same indentation level as before, because the metadata for section 662 describing the indentation level, was not changed.

4.2.2 Uploading Changes to a Server Computer

Returning to FIG. 3, in block 320, the client application determines whether the client computer is connected to the server computer. For example, client application 122 may send a message to activity module 112. If client application 122 receives confirmation from activity module 112 that activity module 112 received the message, then client application 122 may proceed to block 330. Otherwise client application 122 may proceed to block 340 to wait and return to block 320 later.

In block 330, the client application uploads a document, sections in a document, and/or changes to a document and/or one or more sections in the document. For example, client application 122 may upload additional messages describing changes made to the document, and/or sections in the document, that were not already sent to activity module 112. In response, activity module 112 may receive the messages, update the global database 114 to reflect the changes made to the document by client application 122, and echo messages to one or more client applications, such as client application 132.

4.2.3 Maintaining a Global Database on a Server Computer

Figure 4:
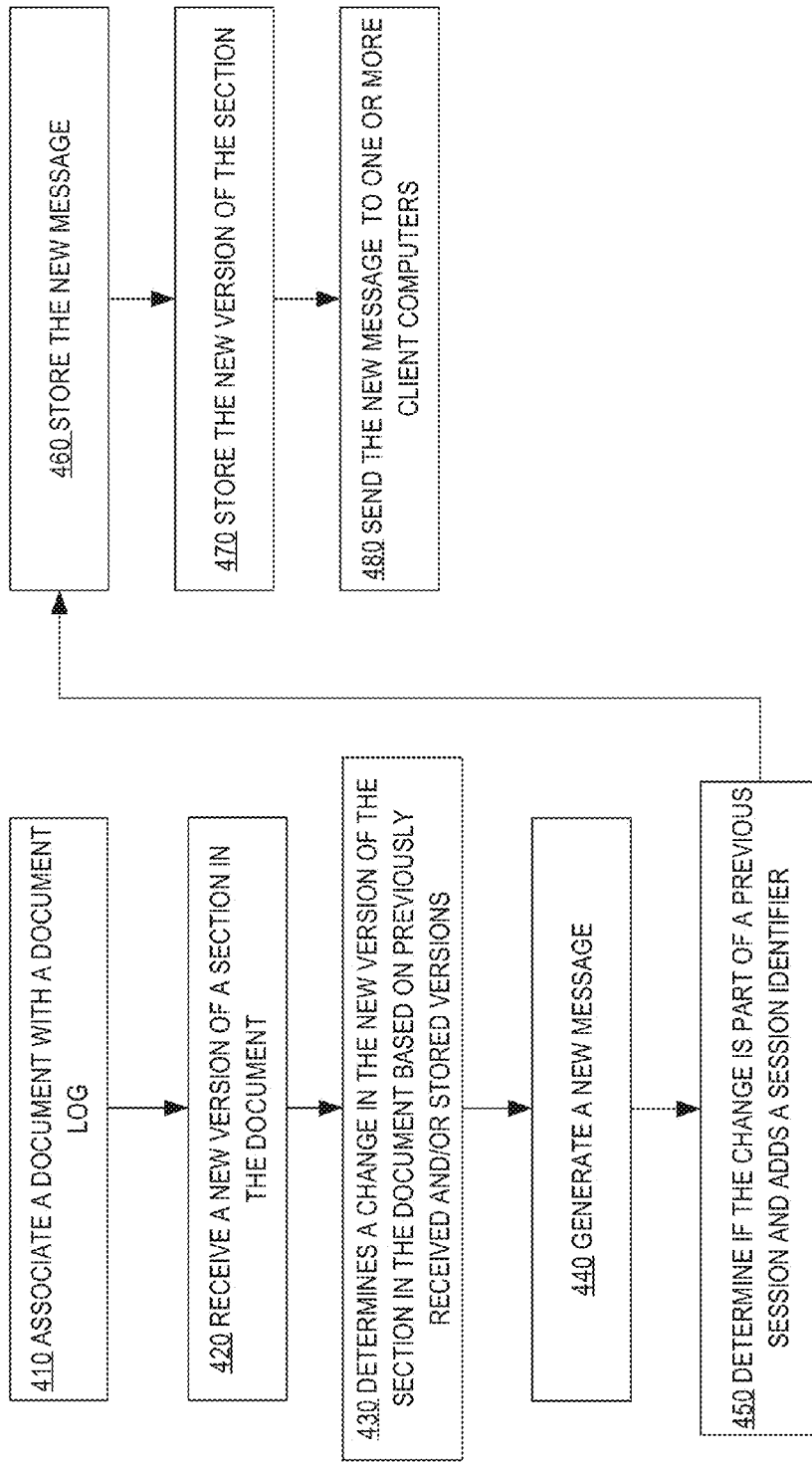
FIG. 4 illustrates a process for an activity module maintaining a document in a global database, in an example embodiment.

FIG. 4 illustrates a process for an activity module maintaining a document in a global database, in an example embodiment. In block 410, an activity module associates a document with a document log. For example, activity module 112 may receive a message from client application 122 indicating that client application 122 has created document log 610 and document 650, and associated document log 610 with document 650. In response, activity module 112 may create document log 610 and document 650 in global database 114. Activity module 112 may associate document log 610 and document 650 in global database 114.

In block 420, the activity module receives a new version of a section in the document. For example, activity module 112 may receive a message from client application 122 with the data comprising section 665, such as the content and metadata in section 665. For purposes of illustrating a clear example, assume the metadata may include a global identifier, 665, and a sequence value, 50. Additionally or alternatively, the message may indicate what changed in section 665. For example, the message may indicate that client application 122 has updated section 665 by replacing "Oranges" with "Apples".

4.2.3.1 Determining a Change in a Section

In block 430, the activity module determines a change in the new version of the section in the document based on previously received and/or stored versions. A change need not be contiguous in a section. A change may comprise one or more changes in the same section, and/or one or more children sections. For example, activity module 112 may query global database 114 for a section with the global identifier 665 and the highest sequence value in global database 114. If global database 114 fails to return a section to activity module 112, then activity module 112 may determine that section 665 is a new section. If global database 114 returns a section to activity module 112, and the sequence value of the returned section is less than or equal to "50", then activity module 112 may compare the section returned from global database 114 and the section received in block 420 to determine a change between the most recent version of the section stored in global database 114 and the version of the section received in block 420. Additionally or alternatively, if the global database returns a section with a sequence value that is greater than "50", then activity module 112 may perform one or more conflict resolution algorithms to determine the change.

In an embodiment, if the global database returns a section with a sequence value that is greater than the sequence value of a section received from a client application, then the activity module may treat the section received from the client application as a change to the most recent version of the section returned from the global database. For example, if the sequence value of the section returned from global database 114 was "60", and the sequence value of the section received from client application 122 was "50", then activity module 112 may compare the section with the sequence value of "60" to the section received from client application 122 as if the section value was greater than or equal to "60".

The change may be sent to client applications indicating that the section was changed. A client application may cause a graphical tile to be displayed with stylized text showing the change(s). A user using the client application may see the graphical tile, determine whether the change should be made and choose whether to keep the new change or revert the section to the previous version.

In the previous example, the client application need not revert the whole document, just the section 665. Thus, two users may edit two different sections of the same document and upload the edited sections at a later time without any errors arising. If two users edit the same section offline, then activity module 112 may either use the method discussed above and/or a three-way merge to resolve merging different versions of the same section.

4.2.3.1.1 Generating a New Version of a Section Using a Three-Way Merge

Figure 5:
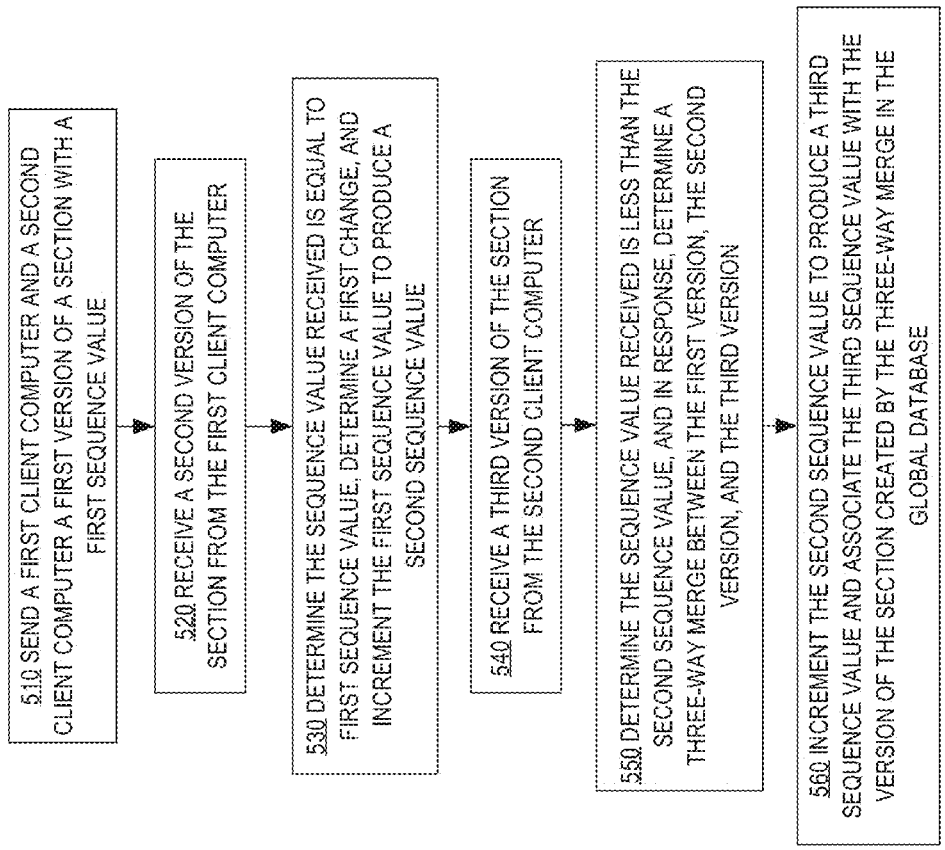
FIG. 5 illustrates a process for resolving changes in multiple versions of the same section.

FIG. 5 illustrates a process for resolving changes in multiple versions of the same section. In block 510, the server computer sends a first client computer and a second client computer a first version of a section with a first sequence value. For example, activity module 112 may send client application 122 and client application 132 the first version section 665 with the sequence value, "60".

In block 520, the server computer receives a second version of the section from the first client computer. For example, client application 122 may update the first version of section 665 to produce the second version of section 665 to include the text "Oranges". When client application 122 is connected to a network and is communicatively coupled with activity module 112, then client application 122 may send a message with a second version of section 665, which includes a sequence value of "60", to activity module 112. Accordingly, activity module 112 may receive the second version of section 665 with the sequence value of "60".

In block 530, the server computer determines the sequence value received is equal to first sequence value, determines a first change, and increments the first sequence value to produce a second sequence value. For example, activity module 112 may determine that the sequence value in the second version of section 665 is equal to the first sequence value in the first version, "60" which is associated with the most recent version stored in global database 114. Activity module 112 may increment the first sequence value to produce a second sequence value, "70". Activity module 112 may store the second version of section 665 with the second sequence value, "70".

In block 540, the server computer receives a third version of the section from the second client computer. For example, client application 132 may update the first version of section 665 to produce a third version of section 665 to include the text "Apples". When client application 132 is connected to a network and is communicatively coupled with activity module 112, then client application 132 may send a message with the first version of section 665, which includes a sequence value of "60", to activity module 112. Accordingly, activity module 112 may receive the third version of section 665 with the sequence value of "60".

In block 550, the server computer determines the sequence value received is less than the second sequence value, and in response, determines a three-way merge between the first version, the second version, and the third version. For example, activity module 112 may determine that the sequence value included with the third version of section 665, "60", is less than the second sequence value, "70". In response, activity module 112 may perform a three-way merge between the first version, the second version, and the third version of section 665.

Activity module 112 may select the first version to perform the three-way merge, because the first version in global database 114 is associated with a sequence value "60", which is the sequence value received with the third version from client application 132. Activity module 112 may select the second version to perform the three-way merge, because the second version is the most recent version in global database 114. Activity module 112 may select the third version to perform the three-way merge, because that is the most recent version received. Activity module 112 may perform a three-way merge on the first version, second version, and third version of section 665 to produce a fourth version of section 665 that includes content from the second version and/or the third version.

In block 560, the server computer increments the second sequence value to produce a third sequence value and associates the third sequence value with the version of the section created by the three-way merge in the global database. For example, activity module 112 may increment the second sequence value to produce a third sequence value, "80". Activity module 112 may store the third sequence value with the fourth version.

The activity module may perform the three-way merge on a section-by-section basis, and need not be perform a three-way merge on the entire document and/or other sections in the document that do not have a conflict. For example, if a client application 122 updates a first in a document, and client application 132 updates a second section in the document, then activity module 112 need not perform a three-way merge on document, the first section, or the second section.

4.2.3.1.2 Locking a Section

In an embodiment, when a client application, such as client application 122, receives input indicating that a user has selected and/or is editing a section, client application 122 may send a message to activity module 112 to lock that section. Activity module 112 may echo the message to one or more client applications, such as client application 132. If client application 132 receives input indicating a user is and/or wants to edit the section, then client application 132 need not update the section. Additionally or alternatively, client application 132 may cause a message to be displayed to the user, explaining that another user is currently editing the section.

When a client application, such as client application 122, determines that a user is no longer editing the section, then client application 122 may send a message to activity module 112 to free the locked section. In response, activity module 112 may echo the message to one or more client applications, such as a client application 132. Client application 132 may allow a user to update the section if selected. Additionally or alternatively, client application 132 may notify a user that the section is unlocked and may be edited.

Client application 122 may determine that a user is no longer editing a section based on one or more factors. For example, if a particular amount of time has passed without receiving input indicating the user is editing the section, then client application 122 may determine that the user is no longer editing the section. Client application 122 may determine that a user is no long editing a section if another section is selected, a cursor moves to another section, the client application is no longer in the foreground, and/or one more other factors.

Activity module 112 may send a message to one or more client applications to unlock the section based on one or more other factors. For example, if activity module 112 is no longer communicatively coupled with client application 122, which is the client application with the lock, then activity module 112 may send a message to one or more client applications to unlock the section. If activity module 112 does not receive an update to the locked section within a particular amount of time, then activity module 112 may send a message to one or more client applications to unlock the section.

4.2.3.1.3 Updating the Sequence Value of a Parent Section

In an embodiment, if an activity module receives a message with a new version of a child section, and in response, the activity module increments the sequence value for the child section, then the activity module may increment the sequence value for each section that is a parent of the child section. For example, if activity module 112 receives a new version of section 665, and activity module 112 increments the sequence value of associated with section 665, then activity module 112 may increment the sequence value of the parent sections, such as the sequence value for section 660.

4.2.3.2 Sending a New Message to One or More Client Applications

Returning now to FIG. 4, in block 440, the server computer generates a new message. For example, activity module 112 may generate a message comprising the new version of the section received in block 420 and/or the change determined in block 430. Additionally or alternatively, activity module 112 may generate a new message by updating and/or duplicating the message received in block 420.

In block 450, the server computer determines if the change is part of a previous session and adds a session identifier. As discussed herein, edits and/or changes may be grouped into session. An activity module may track the edits of each user and determine which edits are part of the same session based on one or more of the factors discussed. If activity module 112 determines that the change is part of a previous session, then activity module 112 may include the session identifier of the session to which the change belongs to. Otherwise, activity module 112 may include a new session identifier, indicating that the change in the message is part of a new session.

In block 460, the server computer stores the new message. For example, activity module 112 may store the new message in global database 114. Thus, activity module 112 may send the new, saved message to one or more client applications that are not currently communicatively coupled. Additionally or alternatively, activity module 112 may send the same message to one or more client applications used by users that are later associated with the document log and/or document.

In block 470, the server computer stores the new version of the section. For example, activity module 112 stores the new version of the new section in global database 114. Thus, activity module 112 may send the new version of the section to one or more client applications that are not currently communicatively coupled to activity module 112. Additionally or alternatively, activity module 112 may send the new version of the section to a user that is later associated with the document and/or document log.

In block 480, the server computer sends the new message to one or more client computers. For purposes of illustrating a clear example, assume the message received in block 420 was received by activity module 112 from client application 122, the received message included a new version of section 665, and that the user using client application 132 on client computer 130 is associated with document 650. Activity module 112 may send the message to client application 132. In response, client application 132 may perform one or more of the methods discussed herein to display the change in document log 610 and update section 665 in document 650. Additionally or alternatively, activity module 112 may send the new message to client application 122. In response, client application 122 may perform one or more of the methods discussed herein to display the change in document log 610 and update section 665 in document 650.

Figure 7:
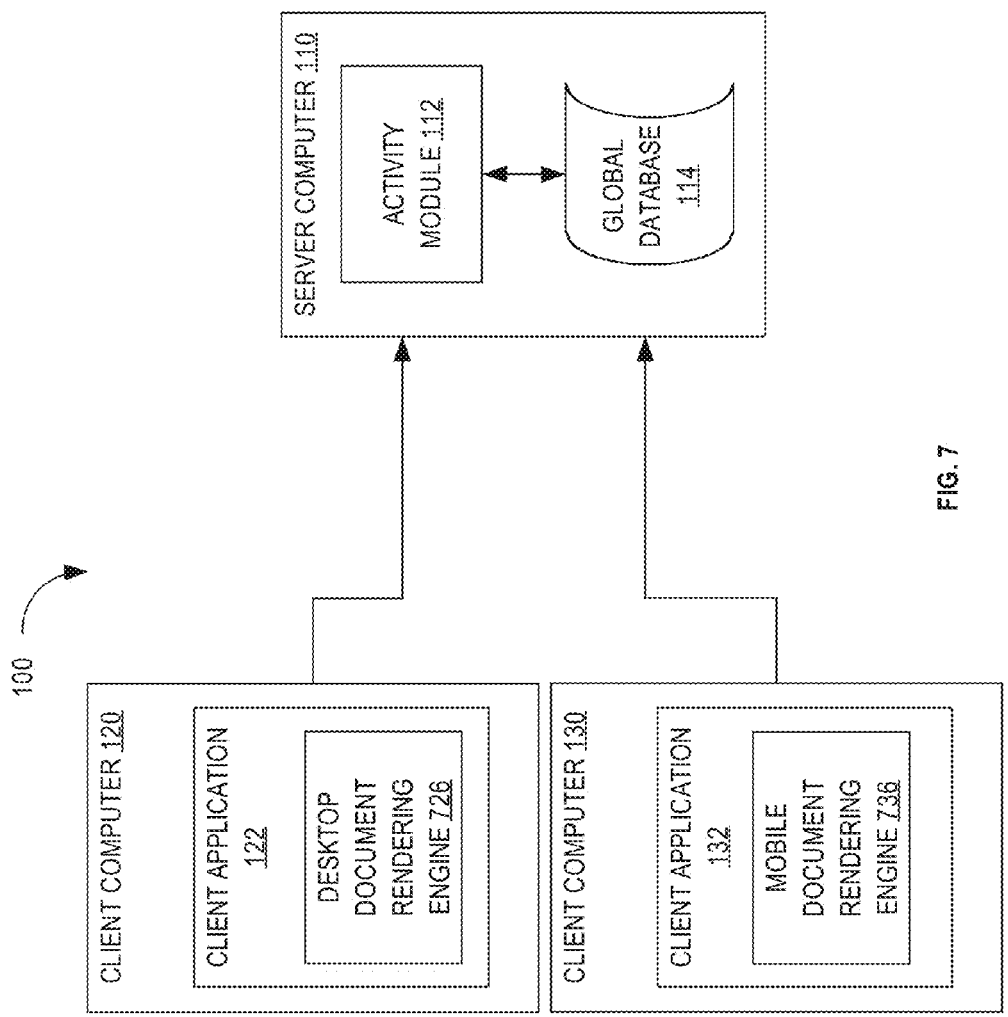
FIG. 7 illustrates a system with two computing devices, each of which executing a specialized rendering engine, in an example embodiment.

4.3 Displaying Documents on Different Devices with Specialized Client Applications A client application may render a document differently than another client application. FIG. 7 illustrates a system with two computing devices, each of which executing a specialized rendering engine, in an example embodiment. In FIG. 7, system 100 comprises server computer 110, client computer 120, and client computer 130, as discussed above with regard to FIG. 1. However, in FIG. 7 client application 122 and client application 132 are specialized client applications because each client application includes a specialized document rendering engine that is configured to render documents for that particular type of device. For purposes of illustrating clear example, assume client computer 120 is a desktop computer that includes a display, and client computer 130 is a mobile device, such as phone, which comprises a substantially smaller display than the client computer 120.

Figure 6C:
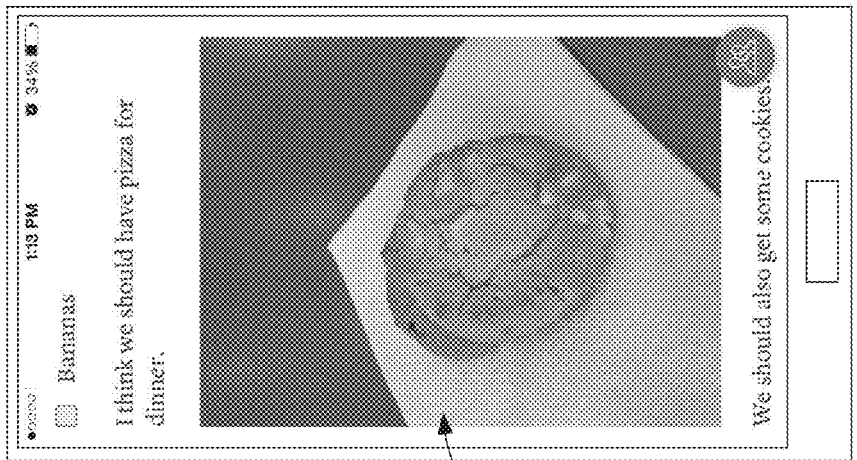

Desktop document rendering engine 726 may present one or more sections in document 650 differently than mobile document rendering engine 736. To illustrate a clear example, assume desktop document rendering engine 726 rendered document 650 on a display as illustrated in FIG. 6A, and that mobile document rendering engine 736 rendered document 650 on a display as illustrated in FIG. 6C. Also assume that section 652 in document 650 includes metadata that indicates section 652 should be left-aligned, and that the sections which text may wrap around section 652. Still further assume that desktop document rendering engine 726 has a rule to display an image in proportion to the font size of surrounding text; and mobile document rendering engine 736 has a rule to display an image inline, without wrapping text around it, at the largest possible size, such that the user does not have to zoom out to see more of the image. Accordingly, desktop document rendering engine 726 may cause section 652 to render according to the metadata as illustrated in FIG. 6A, with section 652 left-aligned and text wrapping around the image. In contrast, mobile document rendering engine 736 may cause section 652 to be rendered as illustrated in FIG. 6C, based on the rules described above. Thus, a user using client computer 130 to view document 650 need not zoom in to see the image in section 652, which may cause the text not to be rendered.

As discuss herein, and as illustrated in FIG. 6A and FIG. 6C, a first specialized document rendering engine renders each section in a document according to a subset of the metadata in each section according to a first set of rules. A second specialized document rendering engine may render each section the document according to a different subset of the metadata in each section according to a second set of rules.

A specialized document rendering engine may render each section in a document independently. For example, in FIG. 6D, mobile document rendering engine 736 may render section 692 independently from section 694. Thus, a user may scroll section 692 horizontally, without causing document 690 as a whole to scroll and without the text in section 694 scrolling out of view. Additionally or alternatively, a user may cause a particular section in a document to zoom in, zoom out, rotate, scroll, scale, change colors, apply a filter, highlight, draw, and/or perform any other transformation independently of another section. Furthermore, a specialized document rendering engine may apply a first transformation to a first section in a document, and a second, different transformation to a second section in the same document concurrently. The first transformation and the second transformation may be one or more different transformations. The author(s) of the document need not write and/or embed code in a document for each section in the document to be rendered according to the rules specified in the specialized rendering engine and/or metadata in each section.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
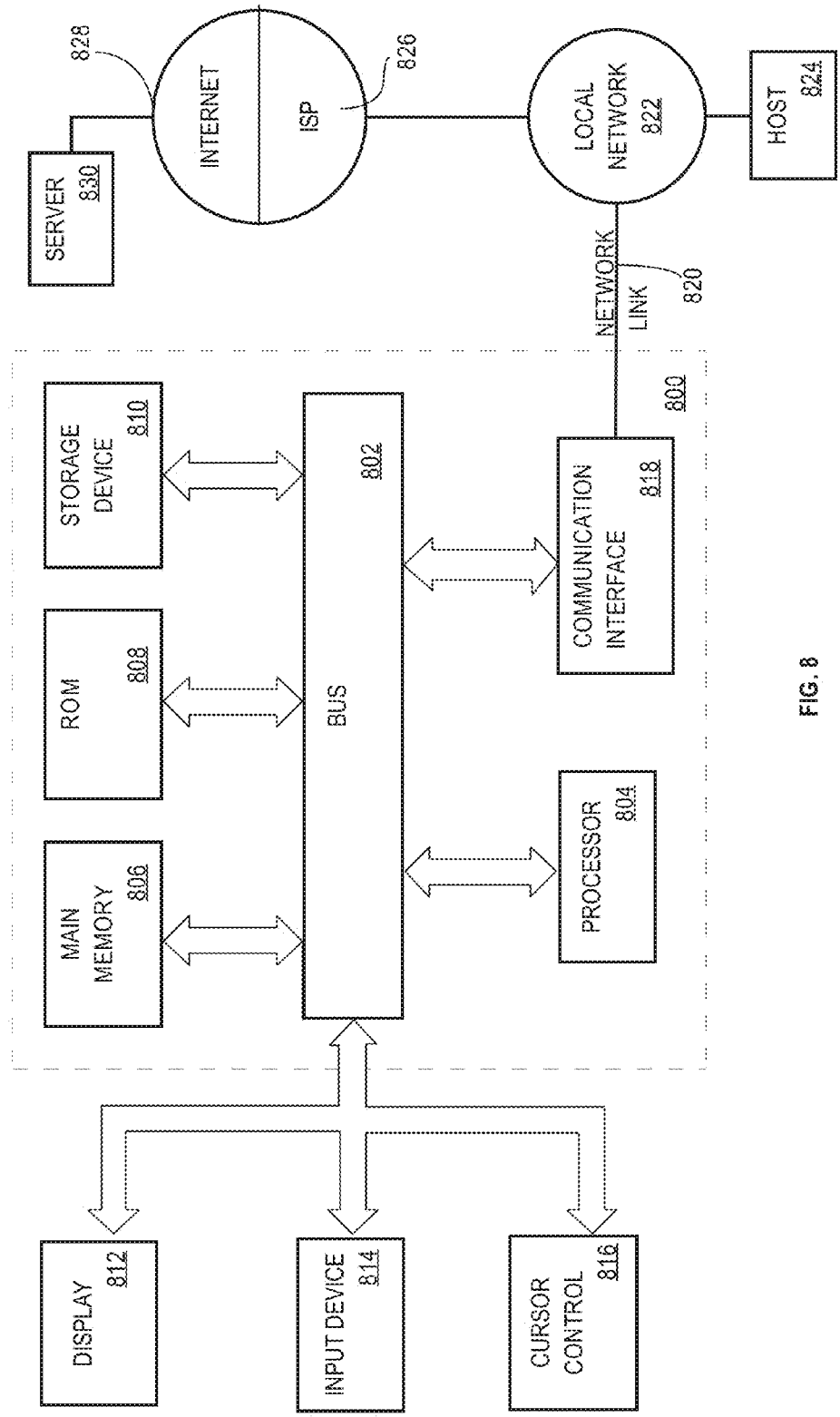
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    associating a document comprising a plurality of sections with a document log;
    receiving, from a first client computer, a first section of the document;
    determining a first change in the document in the first section;
    generating and storing a first message that includes the first change;
    sending, to each client computer of one or more client computers, the first message, which when received by the client computer, causes the client computer to update the document stored on the client computer with the first change and to present the first change to a user in a user interface associated with the document log;
    storing data indicating the first change was made at a first time by a first user;
    sending, to each client computer of the one or more client computers, the data indicating the first user made the first change at the first time;
    receiving, from the first client computer, a second section of the document;
    determining that the second section and the first section are a same section in the document;

determining a second change in the second section based on the first section and the second section;
determining that the second change was made by the first user at a second time;
determining that the second change is part of a first session based, at least in part, on determining that the first user made the first change and the second change within a particular interval of time;
generating and storing a second message that includes the second change and data indicating the first user made the second change at the second time and is part of the first session;
sending, to each client computer of the one or more client computers, the second message, which when received by the client computer, causes the client computer to update the document stored on the client computer with the second change and to present the second change with the first change to a user in the user interface associated with the document log, such that the second change appears to be part of the first change.

2. The method of claim 1 comprising:
determining that the first change is part of a first session, at least in part, on determining that a difference between the first time and the second time is greater than a particular interval of time;
updating the second message to include the second change and data indicating the second change at the second time and is part of the second section;
sending, to each client computer of the one or more client computers, the second message, which when received by the client computer, causes the client computer to update the document stored on the client computer with the second change and to present the second change to a user in the user interface separately indicating the first change and the second change were made during different sessions.

3. The method of claim 1 comprising:
incrementing a first section sequence value associated with the first section;
incrementing a first parent sequence value associated with a parent section, wherein the parent section comprises the first section and the second section, and the first section and the second section comprise disjoint portions of the parent section in the document;
receiving, from a second client computer, the second section of the document;
determining a second parent sequence value and a second section sequence value;
determining the first section is a different section than the second section;
incrementing the first parent sequence value to produce an updated parent sequence value, such that the first parent sequence value is equal to or greater than the second parent sequence value;
updating the second message to include the second section sequence value, and the updated parent sequence value;
sending, to each client computer of the one or more client computers, the second message, which when received by the client computer, causes the client computer to update the second section in the document stored on the client computer with the second change.

4. The method of claim 1 comprising:
determining the first change based on a first version of the first section, which is associated with a first section sequence value;
incrementing the first section sequence value to produce a second section sequence value;
storing a second version of the first section, which includes the first change, with the second section sequence value;
receiving, from a second client computer, the second section of the document, which is associated with the first section sequence value;
determining that the second section is a third version of the first section;
determining the second section sequence value that is greater than the first section sequence value;
in response, determining a three-way change based on a three-way difference between the first version, the second version, and the third version;
incrementing the second section sequence value to produce a third section sequence value, such that the third section sequence value is greater than the second section sequence value;
updating the second message to include the three-way change;
storing the second message;
sending, to each client computer of the one or more client computers, the second message, which when received by the client computer, causes the client computer to update the document stored on the client computer with the three-way change and causes the client computer to present the three-way change to a user in the user interface associated with the document log.

5. The method of claim 1, wherein each section comprises a set of data and a set of metadata describing how the set of data should be displayed to a user, and further comprising:
receiving, from a server computer, a plurality of update messages associated with the document log, wherein each update message is associated with a particular section in the document, indicates a change, indicates a time;
for each update message in the plurality of update messages:
updating the particular section in the document;
generating a graphical tile, wherein the graphical tile is associated with the update message and includes at least a portion of the set of data associated with the section and the change emphasized in stylized text;
causing to display, on a display coupled to a client computer, the graphical tile associated with the update message in a graphical tile list in a graphical user interface in an order based, at least in part, on the time in the update message;
wherein the method is performed by one or more computing devices.

6. The method of claim 5 comprising:
receiving, from the server computer, a post message associated with the document log, wherein the post message includes a body and a particular time;
generating a new graphical tile that is associated with the post message and includes the body;
causing to display, on the display, the new graphical tile with the body in the graphical tile list based on the particular time.

7. The method of claim 6 comprising:
receiving, from the server computer, the post message, wherein the post message includes an attachment;
generating the new graphical tile with a selectable portion;
causing to display the selectable portion in the new graphical tile in the graphical tile list;
receiving, from the client computer, an input indicating that a user selected the selectable portion;
in response, causing opening the attachment.

8. The method of claim 5 comprising:
   storing the plurality of sections of the document, wherein each section comprises an address;
   causing displaying the plurality of sections in the document in an order based, at least in part, on the address in each section of the plurality of sections.

9. The method of claim 5 comprising causing displaying at least a portion of the document in the graphical user interface adjacent to the graphical tile list.

10. The method of claim 5 comprising:
    causing displaying at least the first section of the document in the graphical user interface;
    receiving a new update message that identifies the first section and an update to the first section;
    causing not displaying at least the first section;
    modifying the first section based, at least in part, on the update to produce a new section;
    causing displaying at least the new section.

11. The method of claim 5 comprising:
    receiving a new update message that identifies a new section, a new set of data, a new set of metadata, a new address;
    adding the new section to the document;
    causing displaying at least the new set of data based on the new set of metadata and the new address.

12. The method of claim 5 comprising:
    receiving, from the client computer, an input indicating that a user has selected a specific section in the document, updated the set of data in the section;
    in response to receiving the input:
    updating the set of data associated with the specific section to produce an updated set of data based on the input to produce;
    associated the updated set of data with the specific section;
    incrementing a sequence value associated with the specific section to produce a new section sequence value associated with the specific section;
    uploading the specific section with the updated set of data and the new section sequence value.

13. The method of claim 1, further comprising:
    using a server computer, obtaining from one or more non-transitory computer-readable data storage media a copy of one or more sequences of instructions that are stored on the media and which when executed using a particular user computer among a plurality of user computers cause the particular user computer to perform:
    using the particular user computer alone or in combination with the server computer, wherein each section comprises a set of data and a set of metadata describing how the set of data should be displayed to a user;
    receiving, from a server computer, a plurality of update messages associated with the document log, wherein each update message is associated with a particular section in the document, indicates a change, indicates a time;
    for each update message in the plurality of update messages:
    updating the particular section in the document;
    generating a graphical tile, wherein the graphical tile is associated with the update message and includes at least a portion of the set of data associated with the section and the change emphasized in stylized text;
    causing to display, on a display coupled to a client computer, the graphical tile associated with the update message in a graphical tile list in a graphical user interface in an order based, at least in part, on the time in the update message; and
    using the server computer, downloading the copy of the one or more sequences of instructions to any user computer among the plurality of user computers.

14. The method of claim 13, wherein the one or more sequences of instructions cause the particular user computer to perform:
    receiving, from the server computer, a post message associated with the document log, wherein the post message includes a body and a particular time;
    generating a new graphical tile that is associated with the post message and includes the body;
    causing to display, on the display, the new graphical tile with the body in the graphical tile list based on the particular time.

15. The method of claim 14, wherein the one or more sequences of instructions cause the particular user computer to perform:
    receiving, from the server computer, the post message, wherein the post message includes an attachment;
    generating the new graphical tile with a selectable portion;
    causing to display the selectable portion in the new graphical tile in the graphical tile list;
    receiving, from the client computer, an input indicating that a user selected the selectable portion;
    in response, causing opening the attachment.

16. The method of claim 1, wherein the one or more sequences of instructions cause the particular user computer to perform:
    storing the plurality of sections of the document, wherein each section comprises an address;
    causing displaying the plurality of sections in the document in an order based, at least in part, on the address in each section of the plurality of sections.

17. The method of claim 1, wherein the one or more sequences of instructions cause the particular user computer to perform causing displaying at least a portion of the document in the graphical user interface adjacent to the graphical tile list.

18. The method of claim 13, wherein the one or more sequences of instructions cause the particular user computer to perform:
    causing displaying at least the first section of the document in the graphical user interface;
    receiving a new update message that identifies the first section and an update to the first section;
    causing not displaying at least the first section;
    modifying the first section based, at least in part, on the update to produce a new section;
    causing displaying at least the new section.

19. The data processing method of claim 13, wherein the one or more sequences of instructions cause the particular user computer to perform:
    receiving a new update message that identifies a new section, a new set of data, a new set of metadata, a new address;
    adding the new section to the document;
    causing displaying at least the new set of data based on the new set of metadata and the new address.

20. The method of claim 13, wherein the one or more sequences of instructions cause the particular user computer to perform:
    receiving, from the client computer, an input indicating that a user has selected a specific section in the document, updated the set of data in the section;
    in response to receiving the input:

updating the set of data associated with the specific section to produce an updated set of data based on the input to produce;
associated the updated set of data with the specific section;
incrementing a sequence value associated with the specific section to produce a new section sequence value associated with the specific section;
uploading the specific section with the updated set of data and the new section sequence value.

* * * * *